US007922956B1

(12) United States Patent
Scheidmantel et al.

(10) Patent No.: US 7,922,956 B1
(45) Date of Patent: Apr. 12, 2011

(54) VEHICULAR TRIM COMPONENT AND COVER WITH SIMULATED STITCH AND/OR SEAM THEREON

(75) Inventors: David A. Scheidmantel, Rockford, MI (US); Michael D. Bicard, Jenison, MI (US); Nicholas J. Runnals, Big Rapids, MI (US)

(73) Assignee: Leon Plastics, Inc., Grand Rapids, MI (US)

( * ) Notice: Subject to any disclaimer, the term of this patent is extended or adjusted under 35 U.S.C. 154(b) by 297 days.

(21) Appl. No.: 11/550,850

(22) Filed: Oct. 19, 2006

Related U.S. Application Data

(63) Continuation of application No. 10/711,979, filed on Oct. 18, 2004, now abandoned.

(60) Provisional application No. 60/481,603, filed on Nov. 5, 2003, provisional application No. 60/481,629, filed on Nov. 12, 2003.

(51) Int. Cl.
*B29C 44/02* (2006.01)
*B29C 45/00* (2006.01)
*B29C 71/00* (2006.01)

(52) U.S. Cl. ......................................... 264/294; 264/299

(58) Field of Classification Search .................. 264/239, 264/458
See application file for complete search history.

(56) References Cited

U.S. PATENT DOCUMENTS

| 3,802,291 | A | | 4/1974 | Young, Jr. et al. |
| 3,925,861 | A | | 12/1975 | Tillner |
| 4,130,623 | A | | 12/1978 | Walter |
| 4,279,681 | A | * | 7/1981 | Klimezky ........................ 156/245 |
| 4,711,190 | A | * | 12/1987 | Smith ........................... 112/475.23 |
| 5,382,398 | A | * | 1/1995 | Draxlmaier, Jr. ................. 264/46.5 |
| 6,042,140 | A | * | 3/2000 | Blazaitis et al. ................. 280/728.3 |
| 6,296,802 | B1 | * | 10/2001 | Blazaitis et al. ................. 264/328.1 |
| 6,440,524 | B2 | * | 8/2002 | Valyi et al. ........................... 428/99 |
| 6,749,794 | B2 | * | 6/2004 | Spengler ............................. 264/458 |
| 6,875,390 | B2 | * | 4/2005 | Cowelchuk ........................ 264/255 |
| 7,588,814 | B2 | * | 9/2009 | Olley et al. ......................... 428/102 |
| 2003/0030188 | A1 | * | 2/2003 | Spengler ............................. 264/458 |
| 2003/0168151 | A1 | | 9/2003 | Wright et al. |
| 2004/0089965 | A1 | * | 5/2004 | Malfliet et al. ................... 264/46.6 |
| 2006/0029751 | A1 | * | 2/2006 | Cowelchuk et al. ................ 428/31 |
| 2007/0014969 | A1 | * | 1/2007 | Olley et al. ......................... 428/104 |

* cited by examiner

*Primary Examiner* — Joseph S Del Sole
*Assistant Examiner* — Kimberly A Stewart
(74) *Attorney, Agent, or Firm* — McGarry Bair PC

(57) ABSTRACT

A method for making a cover for a component of a vehicle passenger compartment comprising the steps of molding the cover for the component from a polymeric material, and forming an integrally-formed aesthetic feature in an uninterrupted portion of the cover which simulates a seam between regions of the cover.

15 Claims, 9 Drawing Sheets

VEHICULAR TRIM COMPONENT AND COVER WITH SIMULATED STITCH AND/OR SEAM THEREON

CROSS REFERENCE TO RELATED APPLICATIONS

This application claims the benefit of U.S. Provisional Application Ser. No. 60/481,629, filed Nov. 12, 2003, and U.S. Provisional Application Ser. No. 60/481,603, filed Nov. 5, 2003, and is a continuation of U.S. application Ser. No. 10/711,979, filed Oct. 18, 2004.

BACKGROUND OF THE INVENTION

1. Field of the Invention

The invention relates generally to covers for trim components in a vehicle passenger compartment and more specifically to vehicular trim components with covers comprising composite stitching.

2. Description of the Related Art

Trim components, such as door armrests, center console armrests, and gear shifter boots, for a vehicle passenger compartment of luxury vehicles typically have a leather exterior surface, and leather is often an upgrade option for other vehicles. Leather is considered a highly desired and superior cover material because of its sleek appearance and distinguishable texture. The premium that consumers pay for leather surfaces arises not only from the higher material cost, but also from the manufacturing and assembly costs.

Usually, the leather cover on a trim component comprises two or more pieces of leather that are individually cut and sewn together with a manually operated sewing machine in several steps. To join two pieces of leather 100 and 102, as illustrated in FIG. 1, the pieces 100 and 102 are layered with the exterior leather surfaces 104 facing each other, and a butt seam 106 is sewn along the pieces 100 and 102 at a predetermined distance, approximately one centimeter, from the edge. After the butt seam 106 is in place, the pieces 100 and 102 are folded away from each other such that the two exterior leather surfaces 104 form one continuous surface, which can be seen in FIG. 2, with a crease at the interface of the pieces 100 and 102. The thread of the butt seam 104 is not visible from the exterior when the pieces 100 and 102 are folded open. To provide a refined appearance, the inside edges 108 and 110, which are the portions of the pieces 100 and 102 that are approximately one centimeter wide, are folded away from each other and sewn to their respective pieces of leather 100 and 102, as shown in FIG. 3. The resulting seams 112 and 114 are parallel to and spaced from the butt seam 106. The three seams—the butt seam 106 and the two parallel seams 112 and 114 are known as a French seam 116 and are characteristic of leather covers for vehicular trim components.

After all the pieces of the leather are sewn together with French seams 116 to form a cover 118, the cover 118 is assembled to a rigid shell 120 to construct the vehicular trim component 122, as shown in FIGS. 4A and 4B. The rigid shell 120 is commonly composed of a polymer material or composite material and provides structural support for and defines the shape of the trim component 122. Cushioning, usually a foam layer (not shown) shaped to mate with the shell 120, is positioned over the shell 120, and the leather cover 118 is manually placed over the cushioning and hand-wrapped around the rigid shell 120. The leather cover 118 is stapled to the shell 120, by hand, around the entire edge of the cover 118, as best seen in FIG. 4B. Although the staples are not visible when the trim component 122 is installed in the vehicle compartment, the stapling process requires expensive manual labor and is very time consuming. Furthermore, leather covers 118 cannot be shaped to cover portions of the shell 120 having a small surface area or a complex shape, such as a pull cup 124 in door armrests. As a result, the leather surface trim component 122 is actually a composite component having leather and polymer surfaces.

In an effort to manufacture affordable trim components having the appearance of "cut and sew" hand-wrapped leather products, trim component manufacturers have turned to polymer molding processes. During such processes, molten polymer material, for example a polyvinyl chloride (PVC) or a thermoplastic elastomer (TPE), is injected into a mold, where it solidifies into a part having the shape of the mold. Molds for faux leather trim covers comprise a surface with a texture similar to leather and features resembling French stitching. While the surface texture and butt seams of molded products closely resemble the corresponding aspects of "cut and sew" hand-wrapped leather products, the molded seams parallel to the butt seam have an obvious faux appearance. The absence of thread in the parallel seams is an immediate indicator that the seam is a molded French seam and, therefore, the trim component does not have a leather surface.

SUMMARY OF THE INVENTION

In an embodiment of the invention, a method for making a cover for a component of a vehicle passenger compartment comprising the steps of molding the cover for the component from a polymeric material, and forming an integrally-formed aesthetic feature in an uninterrupted portion of the cover which simulates a seam between regions of the cover.

DESCRIPTION OF THE INVENTION

The invention addresses the deficiencies of the prior art and provides a vehicular trim component with a molded cover having an appearance that closely resembles a "cut and sew" leather cover. The molded cover comprises a composite French seam that has a molded butt seam and threaded parallel side seams.

Figure 5:
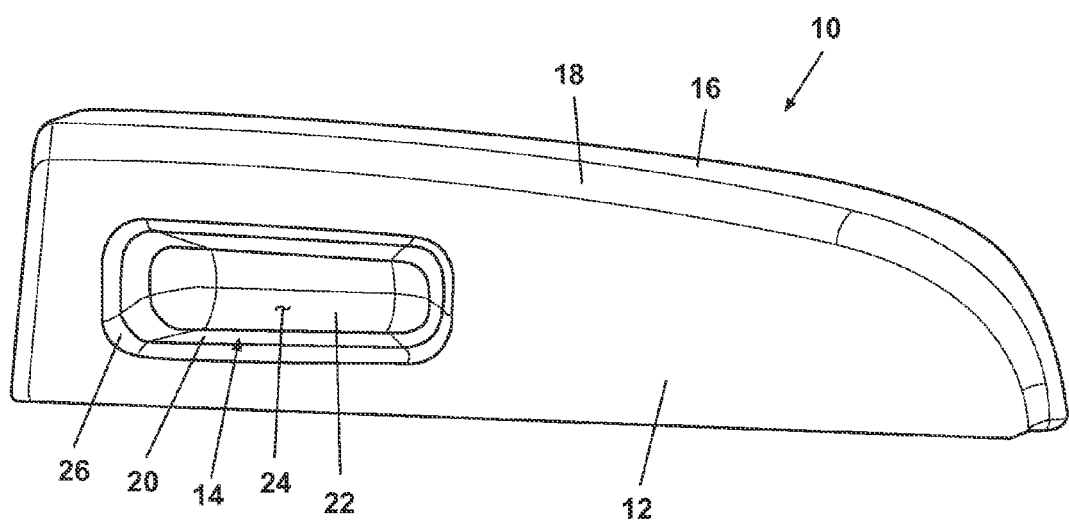
FIG. 5 is a perspective view of a molded armrest cover.

Referring now to the figures and to FIG. 5 in particular, a molded armrest cover 10 comprises a top surface 12, a pull cup 14, and a side surface 16. The top and side surfaces 12 and 16 are substantially orthogonal relative to each other, and the side surface 16 curves according to the contour of the top surface 12. A bight 18 is located at the transition from the top surface 12 to the side surface 16. The pull cup 14, which is formed by a peripheral wall 20 and a bottom wall 22, defines a recess 24 sized to receive a portion of a user's hand. A second bight 26 is disposed at the transition from the top surface 12 to the pull cup 14. Each of the exterior surfaces 12, 14, and 16 of the armrest cover 10 preferably have several small, molded-in, and somewhat randomly oriented lines or depressions to provide a surface texture similar to that of leather. The molded armrest cover 10 is preferably made of a polymer material, for example a polyvinyl chloride (PVC) or a thermoplastic elastomer (TPE), and manufactured with conventional polymer molding processes.

Figure 6:
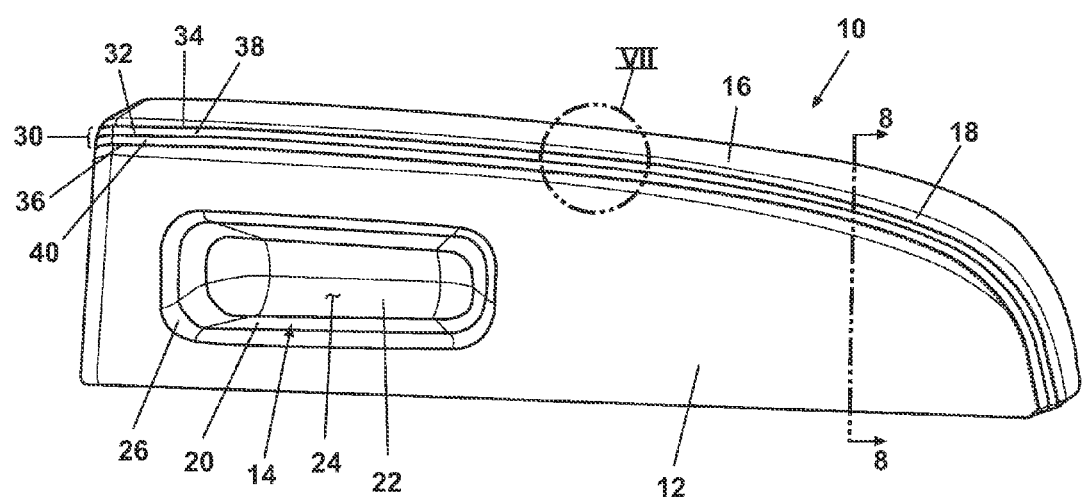
FIG. 6 is perspective view of a molded armrest cover according to the invention and comprising a composite French seam with a molded butt seam and threaded side seams.

As illustrated in FIG. 6, the cover 10 can be adapted to have an appearance similar to an authentic "cut and sew" leather cover by incorporating one or more composite French seams 30 according to the invention. The composite French seams 30 are preferably located in areas, such as along the bight 18 between the top surface 12 and the side surface 16, where real French seams are typically situated.

Figure 7:
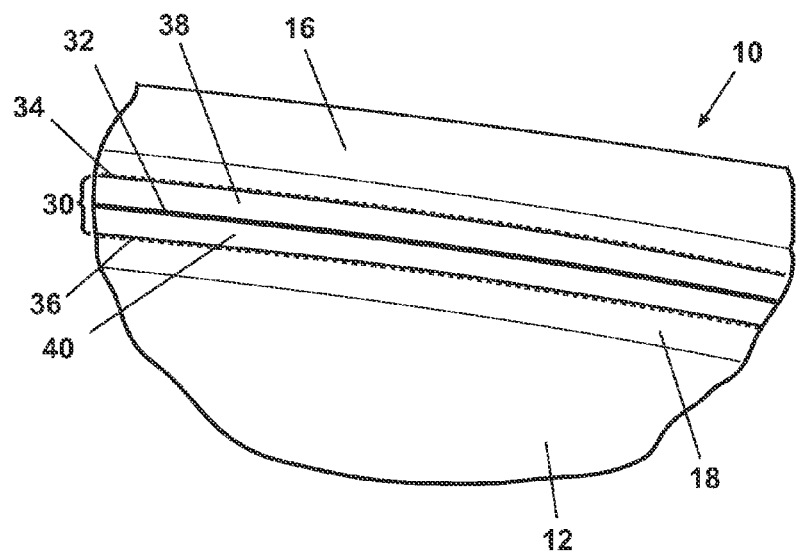
FIG. 7 is an enlarged view the region marked VII in FIG. 6.
Figure 8:
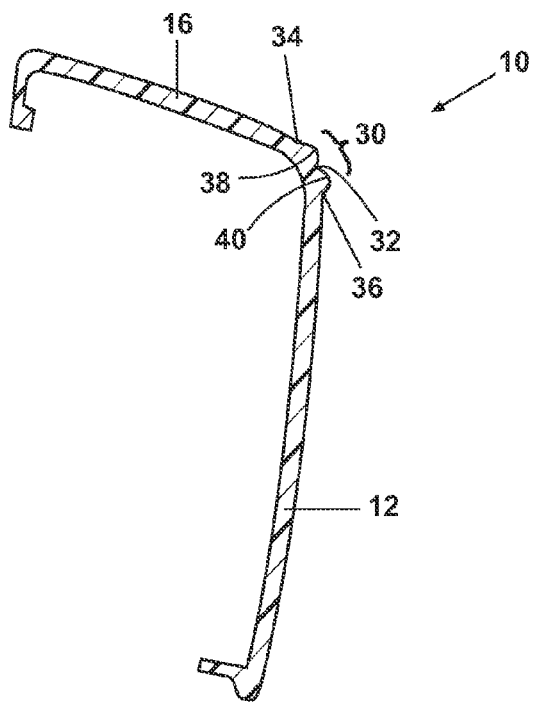
FIG. 8 is a sectional view of the molded armrest cover from FIG. 6 taken along line 8-8.

As best viewed in FIGS. 7 and 8, the composite French seam 30 comprises a center seam 32 between two parallel side seams 34 and 36. The center seam 32 is incorporated into the polymer material during the molding process and is essentially a crease that simulates a butt seam. The side seams 34 and 36 are actual thread-stitched seams, and each side seam 34 and 36 is parallel to the center seam 32 and spaced therefrom by equal distances. The side seams 34 and 36 are sewn into the molded cover 10 with a manually or automatically operated sewing machine using the same thread that is employed in real French seams. Optionally, regions 38 and 40 between the center seam 32 and the side seams 34 and 36, respectively, can be textured or raised to simulate a sight pucker, which is commonly generated when side seams of a French seam are sewn into a leather cover. To further provide a leather-like feel, a painted topcoat (not shown) comprising one or more layers can be optionally applied to the entire exterior surface of the cover 10.

The combination of the molded center seam 32, the thread-stitched side seams 34 and 36, and the regions 38 and 40 therebetween, respectively, readily simulate a real French seam from an authentic "cut and sew" leather cover. In particular, utilizing thread for the side seams 38 and 40 adds an authentic feature to the composite French seam 30 and contributes to the overall "cut and sew" appearance of the cover 10.

Figure 9A:
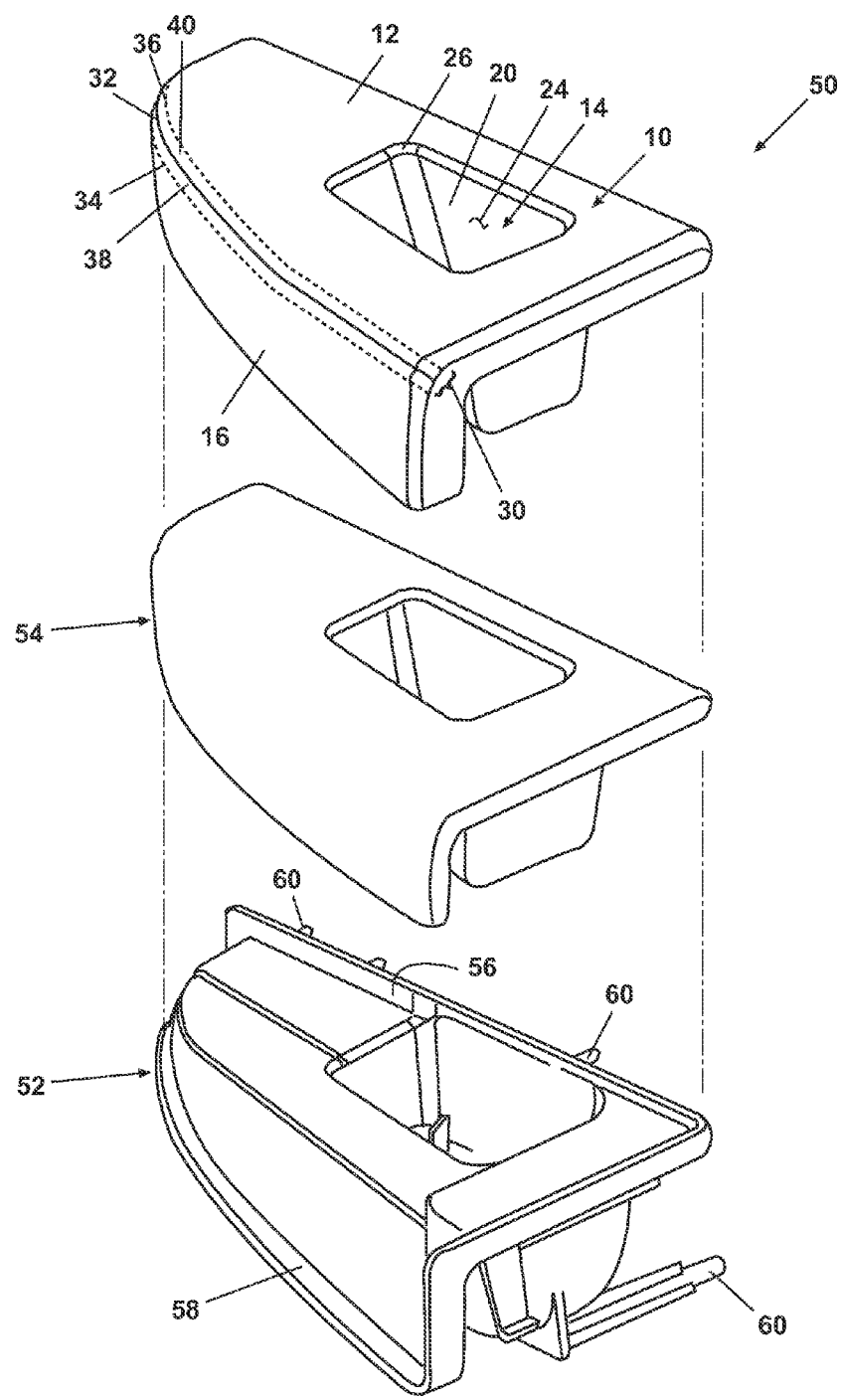
FIG. 9A is an exploded view of an armrest made with the molded armrest cover from FIG. 6.
Figure 9B:
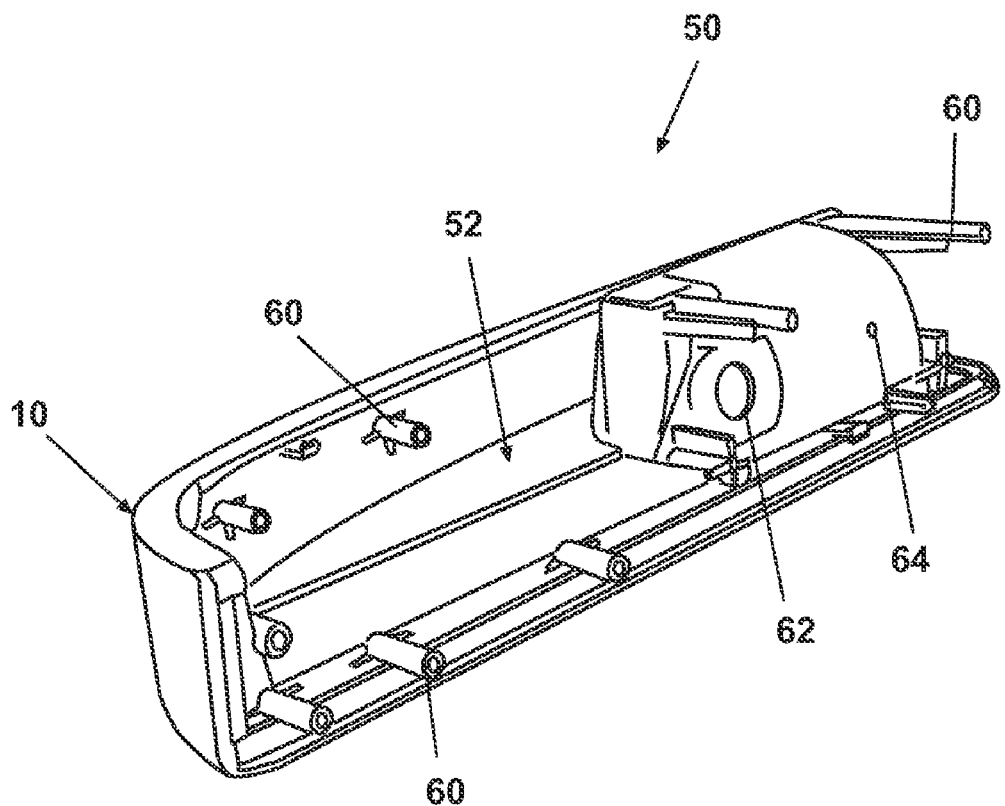
FIG. 9B is a rear perspective view of the armrest from FIG. 9A.

Referring now to FIGS. 9A and 9B, the cover 10 with the composite French seam 30 provides an aesthetically appealing and robust exterior surface for a vehicular armrest 50. In addition to the cover 10, the armrest 50 comprises a rigid shell 52 and a cushion layer 54. The shell 52, which is well known to one skilled in the art, provides structural support for and defines the shape of the armrest 50 and is preferably composed of a polymer material or composite material. Generally, the shell 52 has a shape similar to the cover 10 and further comprises peripheral flanges 56 and 58 and a plurality of pins 60 for mounting the armrest 50 to a vehicle door. Optionally, the shell 52 has an aperture 62 and a vent 64, whose purposes will become apparent hereinafter. The edges of the cover 10 wrap around the peripheral flanges 56 and 58, and an adhesive or other suitable chemical bonding agent or mechanical fastener secures the cover 10 to the shell 52.

The cushion layer 54 is disposed between the cover 10 and the shell 50 and has a varying thickness preferably not exceeding the heights of the flanges 56 and 58. The cushion layer 54 is preferably a foam layer that is either foamed in place through the aperture 62 or cut, using a die, into a shape corresponding to that of the cover 10 and the shell 52. If the cushion layer 54 is a foam-in-place layer, the foam material can optionally contain an adhesive to bond the cover 10 to the shell 32. The foam provides a soft, cushioned ply beneath the cover 10 so that a vehicle occupant can comfortably rest a body part, such as an elbow, on the armrest 50. Additionally, the combination of the cushion layer 54 and the cover 10 impart a tactile feel similar to that of a "cut and sew" hand-wrapped leather armrest.

The sequence of steps in the following descriptions of the manufacturing processes for the cover 10 and the armrest 50 is exemplary. The steps are presented in the following manner in order to provide a clear description of the manufacturing processes. In practice, the process steps can proceed in any logical and suitable order and are not limited to the order described herein.

The cover 10 with the composite French seam 30 according to the invention is manufactured in the following manner. Of course, it will be understood that the manufacturing steps described herein can be performed in any order which would be apparent to one skilled in the art. Liquid or partially liquid polymer material is introduced into a mold having a profile that is the inverse of the cover 10. In addition to the general shape of the cover 10, the mold accounts for the faux-leather surface texture, at least one center seam 32, and the corresponding regions 38 and 40. Once the polymer at least partially solidifies, the mold is opened, and the cover 10 is removed. If a top coat is desired, it can be painted onto the exterior surface of the cover 10.

The threaded side seams 34 and 36 are stitched, with a manually or automatically operated sewing machine, into the cover 10 and adjacent to the at least one center seam 32. Alternatively, the threaded side seams 34 and 36 can be simulated instead of being stitched, such as being formed as a series of in-molded indentations formed in generally parallel fashion adjacent to the center seam 32.

After the stitching is completed and any applied coating and/or paint is sufficiently dry, the cover 10 is ready for use in the manufacture of the vehicular armrest 50.

To assemble the armrest 50 with a foam-in-place cushion layer 54, the cover 10 is attached to the shell 52 by placing the cover 10 onto the shell 52 and wrapping the edges of the cover 10 around the peripheral flanges 56 and 58. The cover 10 and shell 52 are situated with a space therebetween for the cushion layer 54. Next, the foam/adhesive is poured through the shell aperture 62 and into the space between the cover 10 and the shell 52. Air within the space can escape through the vent 64. As the foam solidifies, the cushion layer 54 forms and adheres to both the cover 10 and the shell 52.

When the cushion layer 54 is a die cut foam layer, the armrest 50 is assembled in the following manner. At any time during the assembly process, adhesive is applied to any of the armrest components 10, 52, or 54 to secure the cover 10, the shell 52, and the cushion layer 54 together. The cushion layer 54, already cut into the proper shape, is positioned on the shell 52, and then the cover 10 is placed over the cushion layer 54 and wrapped around the peripheral flanges 56 and 58 of the shell 52.

Figure 1:
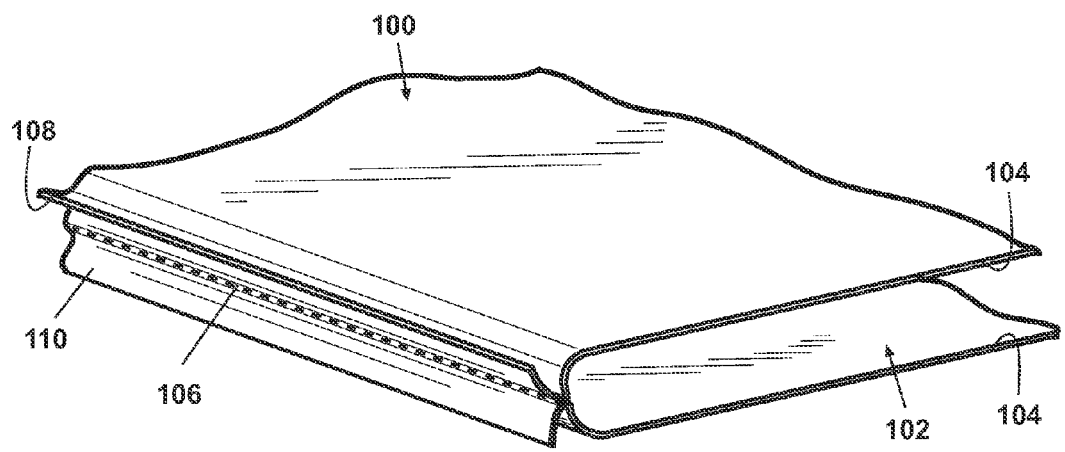
FIG. 1 is a perspective view of two pieces of cut leather, each having an exterior leather surface, wherein the exterior leather surfaces are adjacent one another and a butt seam is sewn along the leather pieces at a predetermined distance from the edge.
Figure 2:
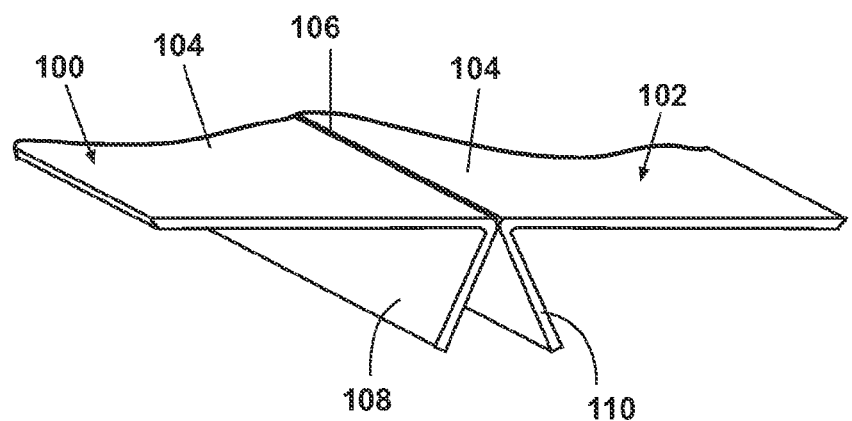
FIG. 2 is a perspective view of the leather pieces from FIG. 1, wherein the pieces are folded away from each other to form a continuous surface with a crease at the butt seam.
Figure 3:
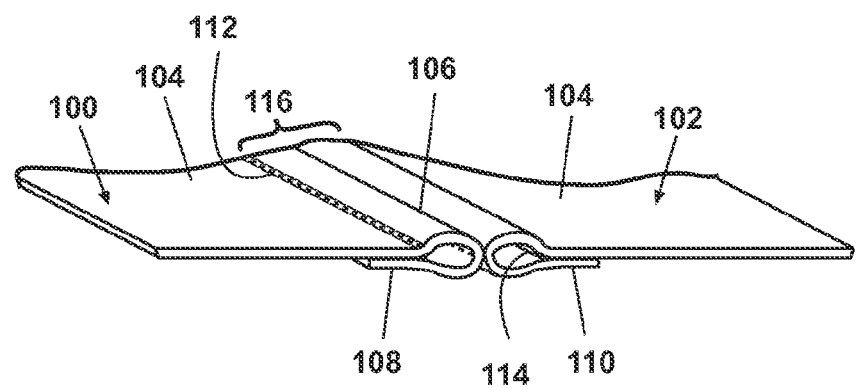
FIG. 3 is a perspective view of the leather pieces from FIG. 2 with the edges folded against their respective leather pieces and sewn to form a French seam.
Figure 4A:
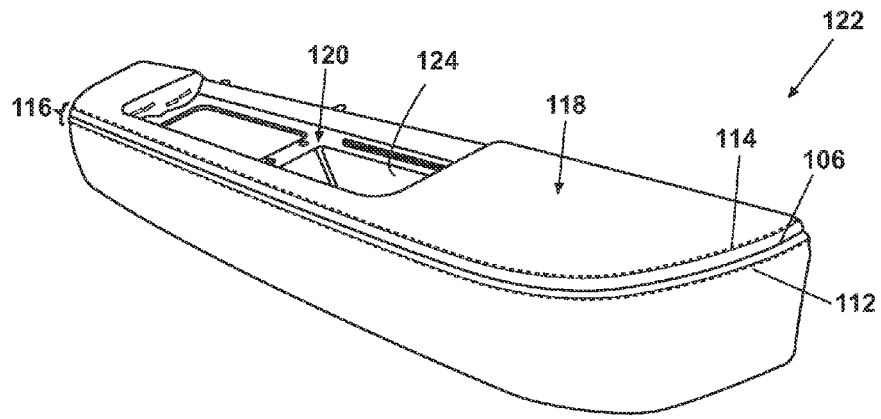
FIG. 4A is a front perspective view of a "cut and sew" hand wrapper leather vehicular trim component made with a leather cover comprising leather pieces similar to those shown in FIG. 3.
Figure 4B:
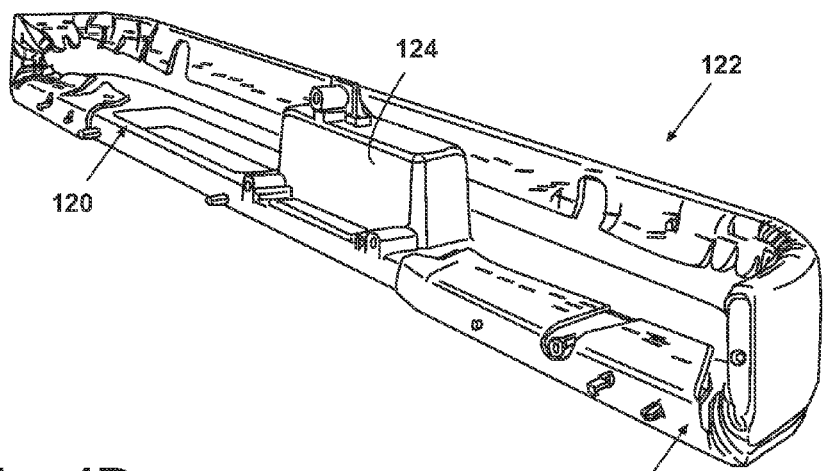
FIG. 4B is a rear perspective view of a "cut and sew" hand wrapper leather vehicular trim component from FIG. 4A.

Regardless of the type of cushion layer 54, the processes to make and assemble the cover 10 and armrest 50 offer several advantages over the prior art "cut and sew" leather hand-wrapped processes. With particular reference to FIGS. 4B and 9B, the cover 10 can be secured with adhesive; therefore, the armrest 50 does not require a plurality of staples, nor labor for inserting the staples, along the inside of the shell 52 to retain the cover 10 to the shell 52. Another apparent advantage is that the composite French seam 30 can be fashioned faster and more efficiently than true French seams because the center seam 32 is molded rather than hand-sewn. Additionally, the cover 10 can be molded into any shape, which can include portions of the shell 52 having a small surface area or a complex shape, such as the pull cup 14. As a result, these portions have a soft feel that is presently unattainable with leather covers. Furthermore, because the cover 10 and armrest 50 can be made and assembled with automated processes, the resulting product is dimensionally accurate and easily reproducible, thus resulting in a higher quality trim component that has an improved leather-like appearance and fit in the vehicle.

Figure 10:
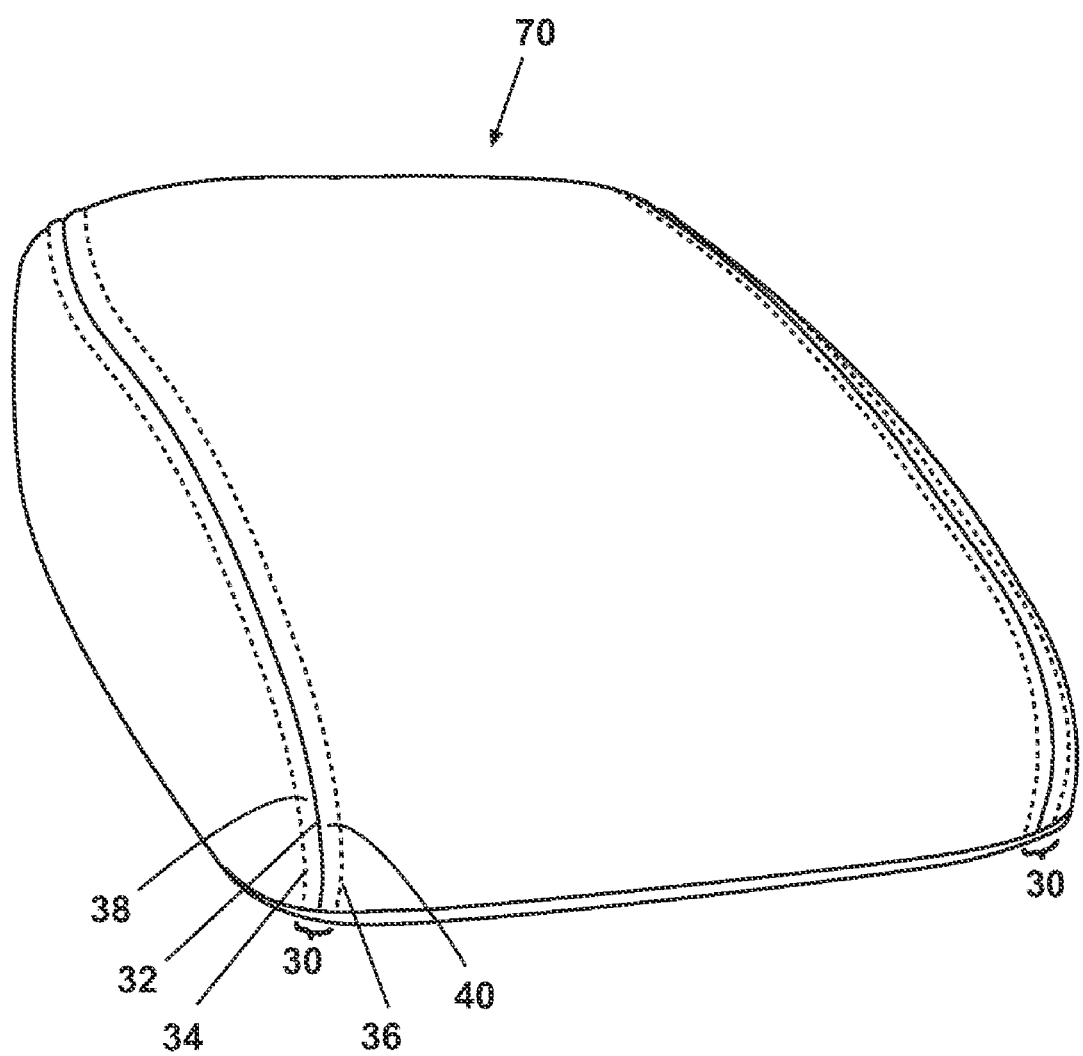
FIG. 10 is a perspective view of a molded center console cover with a composite French seam according to the invention.

While the invention has been described thus far with respect to a cover 10 for an armrest 50, the composite French stitching 30 can be utilized on a cover for any size, shape, or type of vehicular trim components. The invention is not limited to a cover for an armrest; the combination of the molded center seam 32 and the threaded side seams 34 and 36 can be incorporated into, for example, a cover 70 for a center console, which is illustrated in FIG. 10, a gear shift boot, a headrest, or any other interior vehicular trim component.

Molded covers according to the invention and vehicular trim components comprising such covers have an exterior surface that looks and feels like a true leather "cut and sew" surface. Molding the center, butt seam and thread-stitching the parallel side seams creates a composite French seam that has a more authentic appearance than completely molded French seams and is less costly than a true French seam. Furthermore, the polymer material of the molded cover is a proven production material and has less of a tendency to deteriorate over time than leather. Several other advantages of the molded covers for vehicular trim components are apparent from the foregoing description.

Of course, it will also be understood that, while the invention has been described herein with respect to a suitable improvement over a traditional leather trim component, the invention is also applicable as an improved replacement for traditional cut-and-sew vinyl, thermoplastic elastomer (TPE), thermoplastic urethane (TPU) components as well.

Further, while the invention has been described with respect to a French seam, other types of seams can be formed into the trim component. Thus, the particular type of seam (i.e., a French seam) described herein shall not be construed as limiting on the scope of the invention, but rather the formation of any type of seam known to one skilled in the art is contemplated as being within the scope of this invention.

It will be also understood that this invention also relates to decorative components where there is no foam layer between an outer skin/cover and a substrate therebeneath. For example, a door bolster (the decorative part of a door panel typically above the door armrest location) would be a suitable decorative member which typically does not include a foam layer.

While the preferred method of producing the flexible outer cover is the injection molding process there are a number of other processes that could be utilized. This would include but not be limited to rotocasting, slush molding, in mold spray urethane or any other process known to those skilled in the art.

This invention is also not limited to vehicular trim components. For example the seam formation articles, systems and methods described herein would be equally applicable to non-vehicular applications such as, for example, a seat back and/or arm rest in the furniture industry, such as in the office furniture industry.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for making a nonlaminated simulated leather cover for overlying an unfinished surface of a vehicle passenger compartment, said method comprising the steps of:
   providing a mold for forming an exposed obverse side of said nonlaminated simulated leather cover including a raised aesthetic feature in said nonlaminated simulated leather cover;
   introducing a fluid polymer material into said mold to form said nonlaminated simulated leather cover;
   molding said raised aesthetic feature along said obverse side of said nonlaminated simulated leather cover from said fluid polymer material contemporaneously with said introduction of said fluid polymer material into said mold and said production of said nonlaminated simulated leather cover, said raised aesthetic feature simulating a sewn seam joining two separate pieces of an authentic leather cover;
   removing said nonlaminated simulated leather cover from said mold; and
   adding a thread-stitched seam to said nonlaminated simulated leather cover generally parallel to and adjacent said raised aesthetic feature.

2. The method of claim 1 wherein said molding step further comprises molding said raised aesthetic feature as a pair of ridges extending in generally parallel fashion along said nonlaminated simulated leather cover to define an indentation between said ridges, whereby said pair of ridges in cooperation with said indentation therebetween simulates a butt seam.

3. The method of claim 2 wherein each one of said pair of ridges further comprises a rounded exterior.

4. The method of claim 3, and further comprising the step of adding a thread-stitched seam adjacent and generally parallel to said pair of ridges, whereby said thread-stitched seam in combination with said pair of ridges simulate a French seam.

5. The method of claim 1 wherein said molding step further comprises molding said raised aesthetic feature in said nonlaminated simulated leather cover along an intersection between a first obverse surface of said nonlaminated simulated leather cover and a second obverse surface of said nonlaminated simulated leather cover, said first obverse surface and said second obverse surface disposed at an angle defined by said first obverse surface and said second obverse surface, and wherein said intersection defines an apex of said angle.

6. The method of claim 1, and further comprising the step of forming a texture on said exposed obverse side of said nonlaminated simulated leather cover.

7. The method of claim 6 wherein said texture simulates a leather grain.

8. The method of claim 1, and further comprising the step of providing a first mold portion with a first face including a surface relief for molding said raised aesthetic feature in said nonlaminated simulated leather cover.

9. The method of claim 1, and further comprising the step of providing a second mold portion with a second face for forming a hidden reverse side of said nonlaminated simulated leather cover.

10. The method of claim 1, and further comprising the step of producing a nonlaminated flexible simulated leather cover.

11. A method for making a nonlaminated simulated leather cover for overlying an unfinished surface of a vehicle passenger compartment, said method comprising the steps of:
  providing a mold including a first mold portion with a first face for molding an exposed obverse side of a nonlaminated intact piece, said first face including a surface relief for molding a simulated sewn seam in said nonlaminated intact piece, and a second mold portion with a second face for molding a hidden reverse side of said nonlaminated intact piece;
  introducing a pre-heated flowable polymeric material into said mold;
  contemporaneously with said introduction of said preheated flowable polymeric material into said mold, molding said nonlaminated intact piece, including molding said simulated sewn seam along a preselected line in said nonlaminated intact piece;
  removing said nonlaminated intact piece from said mold; and
  stitching at least one side seam in said nonlaminated intact piece generally parallel to and adjacent said simulated sewn seam to simulate a French seam joining two separate pieces of authentic leather.

12. The method of claim 11 wherein said at least one side seam includes a stitched side seam on either side of, generally parallel to, and adjacent said simulated sewn seam.

13. The method of claim 11, and further comprising the step of producing a nonlaminated flexible simulated leather cover.

14. A method for covering an unfinished surface of a trim component shell in a vehicle passenger compartment with a single-layer simulated leather cover, said single-layer simulated leather cover simulating an authentic leather cover for covering said unfinished surface, and formed from two separate pieces of authentic leather joined with a stitched seam, said method comprising the steps of:
  providing a mold including a first mold portion with a first face for molding an exposed obverse side of said single-layer simulated leather cover, said first face including a surface relief for molding a simulated sewn seam in said single-layer simulated leather cover, and a second mold portion with a second face for molding a hidden reverse side of said single-layer simulated leather cover;
  molding said single-layer simulated leather cover from a fluid polymer material, said single-layer simulated leather cover having a configuration complementary to a configuration of said unfinished surface of said trim component shell;
  contemporaneously with molding said single-layer simulated leather cover molding from said single fluid polymer material said simulated sewn seam extending along said exposed obverse side of said single-layer simulated leather cover;
  adding a thread-stitched seam to said single-layer simulated leather cover generally parallel to and adjacent said simulated sewn seam; and
  installing said single-layer simulated leather cover over said unfinished surface of said trim component shell with said hidden reverse side facing said unfinished surface of said trim component shell so that a location of said simulated sewn seam relative to said unfinished surface of said trim component shell corresponds with a location of said stitched seam joining said two separate pieces of authentic leather relative to said unfinished surface of said trim component shell.

15. The method of claim 14, and further comprising the step of producing a nonlaminated flexible simulated leather cover.

* * * * *